United States Patent
Frank et al.

(10) Patent No.: US 6,626,505 B2
(45) Date of Patent: Sep. 30, 2003

(54) BRAKING PRESSURE MODULATOR FOR AN ELECTRONIC BRAKING SYSTEM

(75) Inventors: Dieter Frank, Hannover (DE); Gerdt Schreiber, Isernhagen (DE); Peter Homann, Neustadt (DE); Armin Sieker, Bielefeld (DE); Andreas Kranz, Wunstorf (DE); Hartmut Schappler, Hannover (DE); Hans-Klaus Wolff, Springe (DE); Dirk Meier, Soolze (DE)

(73) Assignee: WABCO GmbH & Co. OHG, Hannover (DE)

( * ) Notice: Subject to any disclaimer, the term of this patent is extended or adjusted under 35 U.S.C. 154(b) by 30 days.

(21) Appl. No.: 09/792,429

(22) Filed: Feb. 23, 2001

(65) Prior Publication Data

US 2001/0033105 A1 Oct. 25, 2001

(30) Foreign Application Priority Data

Feb. 26, 2000 (DE) .......................... 100 09 118
Dec. 15, 2000 (DE) .......................... 100 62 625

(51) Int. Cl.$^7$ ............................................. B60T 13/70
(52) U.S. Cl. .............................. 303/15; 303/7; 303/3; 303/118.1; 137/596.17
(58) Field of Search .......................... 303/15, 7, 3, 20, 303/119.1, 119.2, 9.62, 119.3, 118.1; 137/596, 596.17, 596.13, 884

(56) References Cited

U.S. PATENT DOCUMENTS

| 4,102,526 A | | 7/1978 | Hargraves |
| 4,245,815 A | | 1/1981 | Willis |
| 4,496,192 A | * | 1/1985 | Grauel et al. .................. 303/13 |
| 4,589,705 A | * | 5/1986 | Huber ......................... 303/36 |
| 4,616,881 A | * | 10/1986 | Muller et al. ................... 303/7 |
| 4,861,115 A | * | 8/1989 | Petersen ....................... 303/15 |
| 5,042,883 A | * | 8/1991 | McCann et al. ................. 303/7 |
| 5,127,434 A | | 7/1992 | Kline et al. |
| 5,577,322 A | | 11/1996 | Ohshita et al. |
| 5,718,486 A | * | 2/1998 | Vollmer et al. ................ 303/15 |
| 5,823,507 A | | 10/1998 | Inden et al. |
| 5,845,672 A | | 12/1998 | Reuter et al. |
| 6,095,622 A | | 8/2000 | Oishi et al. |
| 6,206,481 B1 | * | 3/2001 | Kaisers et al. .................. 303/7 |
| 6,386,649 B1 | * | 5/2002 | Ross ....................... 303/119.2 |

FOREIGN PATENT DOCUMENTS

| DE | 27 57 803 | | 6/1979 |
| DE | 33 08 279 | | 9/1984 |
| DE | 4008095 A1 | * | 9/1991 |
| DE | 41 40 271 A1 | | 6/1993 |
| DE | 42 27 084 A | | 2/1994 |

(List continued on next page.)

Primary Examiner—Jack Lavinder
Assistant Examiner—Mariano Sy
(74) Attorney, Agent, or Firm—Proskauer Rose LLP

(57) ABSTRACT

A pre-engagement unit for a braking pressure modulator for a pressure regulating circuit includes a first pneumatic inlet, a second pneumatic inlet, a first pneumatic output terminal, and a second pneumatic output terminal. The unit includes an electrically actuated valve system having a plurality of solenoid valves and a plurality of electrical terminals connected to output terminals of an electronic control unit. An electric braking command signal transmitter delivers a driver initiated electric brake value setting to an input of the electronic control unit. Under normal conditions, a supply pressure and a redundancy pressure are delivered at the first pneumatic output terminal to be converted by an air quantity augmenting relay valve to a braking pressure. In case of failure of the electronic braking system, the redundancy pressure is delivered at the first pneumatic output terminal to be converted by the air quantity augmenting relay valve to the braking pressure.

14 Claims, 5 Drawing Sheets

FOREIGN PATENT DOCUMENTS

| | | |
|---|---|---|
| DE | 42 27 084 | 2/1994 |
| DE | 195 04 883 | 11/1996 |
| DE | 196 09 222 | 9/1997 |
| DE | 199 18 070 | 12/1999 |
| DE | 196 36 432 | 6/2000 |
| DE | 197 30 276 | 8/2000 |
| EP | 0 499 670 | 8/1992 |
| EP | 0 547 407 A | 6/1993 |
| EP | 0 893 636 | 1/1999 |
| EP | 0 837 274 | 8/1999 |
| WO | WO 99/51901 | 10/1999 |

* cited by examiner

2/2 - WAY VALVE NORMALLY CLOSED
MAGNET COIL NOT UNDER CURRENT

2/2 - WAY VALVE NORMALLY OPEN

3/2 - WAY VALVE

MAGNET COIL UNDER CURRENT

BRAKING PRESSURE MODULATOR FOR AN ELECTRONIC BRAKING SYSTEM

BACKGROUND OF THE INVENTION

The invention relates to a braking pressure modulator.

German patent document DE 42 27 084 A1 discloses a braking pressure modulator, designated therein as a pressure regulating module.

This known patent shows a two-channel pressure regulating module in FIG. 2 in which a common 3/2-way solenoid valve (therein 12) is provided as a reversing valve that connects both channels via a line (therein 15) either to the supply pressure (therein 17) in the actuated state of the valve 12, or to a control pressure (therein 13) in the non-actuated state of the valve 12. For purposes of this discussion, it shall be assumed that the 3/2-way solenoid valve 12 of DE 42 27 084 A1 is actuated, so that the supply pressure is being supplied to the other solenoid valves in FIG. 2. This represents the case of pressure regulation.

One of the two symmetrically configured pressure regulating circuits in DE 42 27 084 A1, i.e., the one containing the valves 9', 7 and 3, is now considered. The 3/2-way solenoid valve (therein 9') determines the direction of any pressure change in this circuit. In the non-actuated state of valve 9' (as shown in FIG. 2 therein), a pressure increase takes place in this circuit since the supply pressure 17 is taking effect. In the actuated state of valve 9', a pressure lowering takes place due to the connection of valve 9' to the exhaust (therein 11'). The 2/2-way solenoid valve (therein 7) is connected in series to the valve 9' and either establishes a connection to a control inlet of the downstream relay valve (therein control inlet 5) in its non-actuated state (as shown in FIG. 2), or closes off this control inlet in its actuated valve position.

Due to the series connection of the two valves 7 and 9', these must jointly be brought into a given state in order to achieve a desired pressure change at the control inlet 5. Thus, they are not independent of each other but can only be operated simultaneously and together. This represents a cost disadvantage because the utilization of a 3/2-way solenoid valve with reversing function (i.e., valve 9'), and the requirement of great tightness in fitting at the two corresponding valve seats, are relatively expensive.

When using the 3/2-way solenoid valve 9' as a reversing valve, a velocity disadvantage manifesting itself by a reduced actuation rate occurs because of the usual design of 3/2-way solenoid valves which have elastomer sealing seats provided at the armature for both switching positions.

It is therefore the object of the present invention to modify a pre-engagement unit of a braking pressure modulator of the type mentioned initially in such manner that the time response will be improved.

SUMMARY OF THE INVENTION

This object is achieved by a pre-engagement unit for a braking pressure modulator for a pressure regulating circuit of an electronic braking system of a vehicle, the pre-engagement unit including a first pneumatic inlet through which a supply pressure is supplied to the pre-engagement unit, a second pneumatic inlet through which a redundancy pressure is supplied to the pre-engagement unit, a first pneumatic output terminal through which the pre-engagement unit is connected to an air quantity augmenting relay valve, and a second pneumatic output terminal through which the pre-engagement unit is connected to a pressure sink. The pre-engagement unit also includes an electrically actuated valve system having a plurality of solenoid valves including a plurality of electrical terminals which are connected to output terminals of an electronic control unit. An electric braking command signal transmitter of the vehicle delivers a driver initiated electric brake value setting to an input of the electronic control unit. Under normal conditions, both the supply pressure and the redundancy pressure are delivered at the first pneumatic output terminal to be converted by the air quantity augmenting relay valve to a braking pressure determined by the electric brake value setting. In the case of a failure in the electronic braking system, the redundancy pressure is delivered at the first pneumatic output terminal to be converted by the air quantity augmenting relay valve to the braking pressure.

Due to the fact that with the invention the pressure is influenced by the redundancy pressure at the pneumatic output terminal of the pre-engagement unit even in normal operation, the advantage is created that the pressure build-up is accelerated in case of full braking and that the pressure reduction is shortened in case of ABS braking.

Further developments of the invention that concern the pneumatic circuit of the pre-engagement unit have the advantage of reduced manufacturing costs.

In the patent document DE 42 27 084 A1, the suggestion is made through various embodiments to achieve economy by reducing the number of solenoid valves and thereby to save on pneumatic channels and similar components. The present invention abandons the idea to a great extent that the number of solenoid valves as such is the most important factor in saving costs. In the present invention, the average number of 3 solenoid valves per channel is even slightly greater than the average number of 2.5 solenoid valves per channel in the known patent. Instead, the invention emphasizes a novel valve design and a pneumatic circuit by means of which the solenoid valves of this novel valve design can be operated optimally.

In a further development of the invention, in which a solenoid valve provided for pressure increase in the pre-engagement unit is connected in parallel to a solenoid valve provided for pressure reduction, the advantage is obtained that the two valves can be actuated simultaneously. By selecting different nominal values and the possibility to use both valves at the same time or only one at a time for pressure modulation, great precision or high speed pressure modulation can be obtained. It is also possible to obtain both high speed and great precision in pressure modulation.

A further development of the invention has the advantage that the armatures can be made in a particularly space-saving configuration by employing sealing seats that form metal-to-metal seals when the solenoid valves are under current. The solenoid valves switch very rapidly thanks to their short strokes. Because of these short strokes and the low demands made upon the armature force, the magnet coils producing the magnetic force and thereby the entire construction unit can be kept small.

In another further development of the invention, the armatures of the solenoid valves are standardized, and by using identical armatures manufactured in large quantities, costs are reduced.

BRIEF DESCRIPTION OF THE DRAWINGS

The invention is described in greater detail below through the embodiments shown in the drawings, wherein.

DETAILED DESCRIPTION OF PREFERRED EMBODIMENTS OF THE INVENTION

Figure 1:
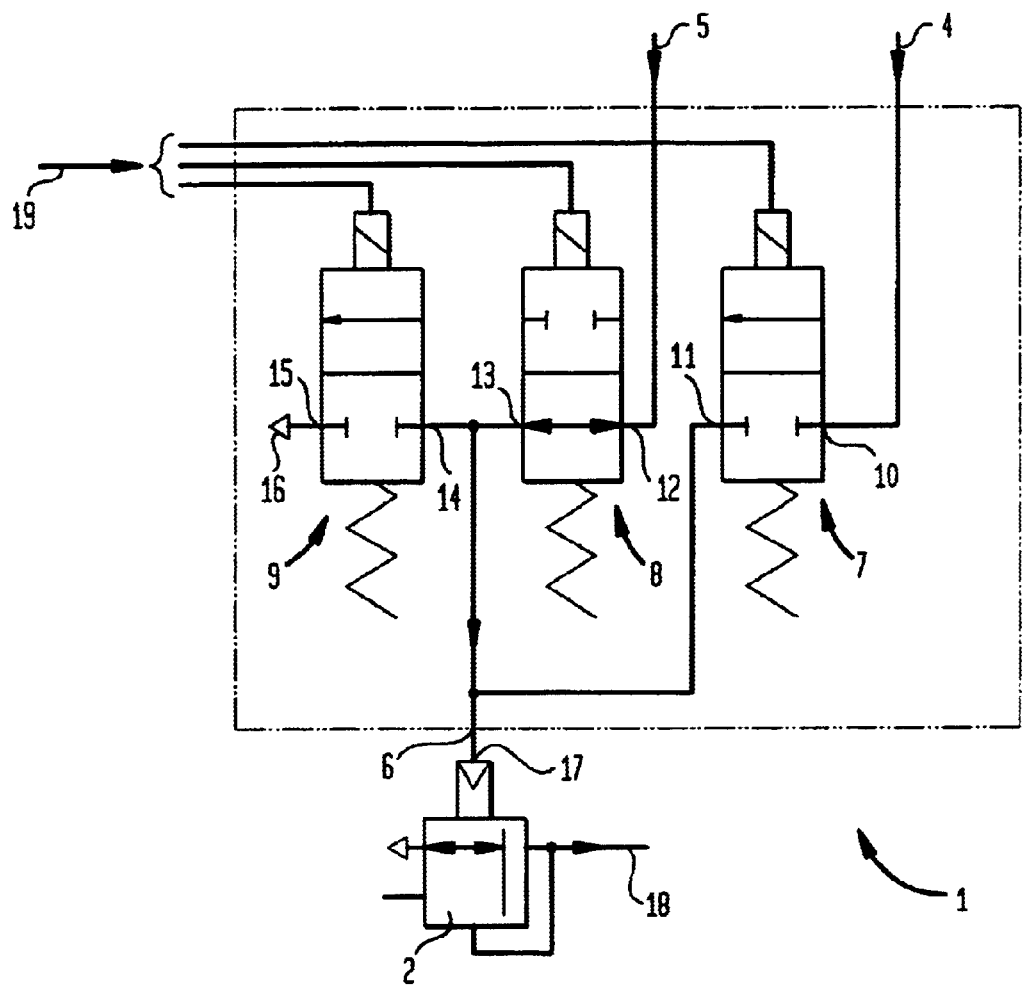
FIG. 1 shows the inventive pre-engagement unit of a braking pressure modulator for a brake regulating circuit.

An electronically regulated braking system (EBS) for trailer vehicles has several brake regulating circuits working independently of each other for the wheel brakes of the vehicle (multi-channel system). A brake regulating circuit which represents a pressure regulating channel for a wheel brake consists of a pre-engagement unit made up of solenoid valves, an air quantity augmenting relay valve, at least one brake cylinder for the wheel brakes, a braking pressure sensor installed at a suitable location, and an electronic control system which carries out the braking pressure regulation.

The brake regulating circuit for the different channels of the multi-channel system are of identical construction, so that the description of one brake regulating circuit also describes the other brake regulating circuits. The embodiment described herein is based on the configuration of a basic variant for a trailer EBS system of a semi-trailer having two axles. The trailer EBS system is a 4S/2M system (four ABS sensors for four wheels and two modulator channels for the wheel brakes of the left or right side). The braking pressure regulation is therefore carried out per side.

The EBS trailer vehicle is connected to an EBS tractor vehicle via an electrical and via a pneumatic interface. The electrical interface consists of the digital data interface according to ISO 1199-2. The pneumatic interface consists first of the supply channel which supplies air to the trailer, and secondly of the braking line which is connected in the trailer to a trailer braking valve. The trailer braking valve puts out a braking pressure at its pneumatic output terminal which is derived from the braking pressure transmitted in the pneumatic braking channel and refers to it.

On the side of the EBS tractor vehicle, the supply and control lines are connected to a trailer control valve. The combination of the trailer control valve and the trailer braking valve provides security against a tear-off condition in case of brake failure as is known from a conventionally braked vehicle combination (tractor vehicle/trailer vehicle). (As used herein, the term "tear-off condition" refers to a condition wherein the two air tubes connecting the trailer to the tractor are "torn off." Due to a safety feature implemented in the trailer and tractor valves, automatic braking of the trailer takes place when this condition occurs.) In case of such a tear-off condition, the trailer braking valve also transmits a braking pressure in the known manner.

Since the tear-off protection is made as stated in the same manner as for a conventionally braked vehicle, the EBS trailer vehicle can also be operated behind a tractor vehicle with a conventional braking system. Therefore, the trailer braking valve in the EBS trailer vehicle also contains the required functions of a conventional trailer braking valve in conventional braking systems, such as tear-off function and check valve.

In the trailer vehicle, the pressure transmitted by the trailer braking valve serves for pneumatic, redundant braking in case of an EBS failure. Furthermore, with the utilization of a pressure sensor located in the trailer braking valve, it serves to determine the electrical target value for the case that the EBS trailer is operated with a conventional tractor vehicle, i.e., with a non-EBS tractor vehicle. This transmitted pressure represents the redundancy pressure.

Figure 2:
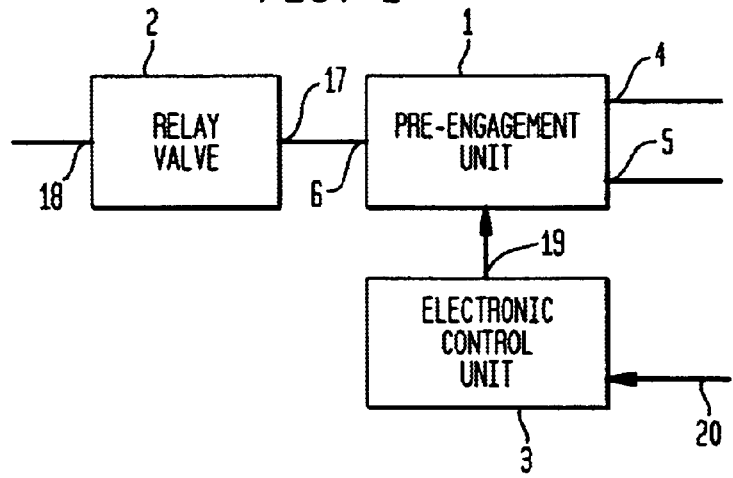
FIG. 2 shows a block diagram of a braking pressure modulator with a pre-engagement unit according to FIG. 1.

Turning now to FIG. 2, a block diagram of the braking pressure modulator shows the pre-engagement unit 1 and the functional units with which the pre-engagement unit interacts, i.e., the electronic control unit 3 and the air quantity augmenting relay valve 2.

The pre-engagement unit 1 is provided with a first pneumatic inlet 4 which is connected to the supply pressure, and with a second pneumatic inlet 5 which is connected to the pneumatic output terminal of the trailer braking valve (not shown) for transmission of the redundancy pressure. A pneumatic output terminal 6 of the pre-engagement unit 1 is connected to the inlet 17 of the relay valve 2.

The electrical interface is connected via a line 20 to the electrical control unit 3 for the transmission of the set electrical brake value, and electrical control lines 19 coming from the electronic control unit 3 are provided for the solenoid valves of the pre-engagement unit 1.

The pneumatic output terminal 18 of the relay valve 2 is connected to the brake cylinders (not shown) of this brake regulating circuit.

As shown in FIG. 1, three solenoid valves are provided in the pre-engagement unit 1. A first solenoid valve 7 has a first terminal 10 and a second terminal 11, a second solenoid valve 8 has a first terminal 12 and a second terminal 13, and a third solenoid valve 9 has a first terminal 14 and a second terminal 15.

The first terminal 10 of the first solenoid valve 7 is connected to the first pneumatic inlet 4 of the pre-engagement unit 1, the first terminal 12 of the second solenoid valve 8 is connected to the second pneumatic inlet of the pre-engagement unit 1, the second terminal 11 of the first solenoid valve 7 is connected to the pneumatic output terminal 6 of the pre-engagement unit 1, the second terminal 13 of the second solenoid valve 8 is connected to the first terminal 14 of the third solenoid valve 9 and to the pneumatic output terminal 6, and the second terminal 15 of the third solenoid valve 9 is connected to a pressure sink 16.

The first solenoid valve 7 and the third solenoid valve 9 are in the form of normally closed 2/2-way solenoid valves, while the second solenoid valve 8 is in the form of a normally open 2/2-way solenoid valve.

The solenoid valves 7, 8, and 9 of the pre-engagement unit 1 serve to determine the pressure in the control chamber of the relay valve 2. They are operated in a pulsating manner.

In its unactuated state, the second solenoid valve 8 is open and serves to transmit the redundancy pressure from the second pneumatic inlet 5 of the pre-engagement unit 1 into the control chamber of the relay valve 2, when the other solenoid valves 7 and 9 are not actuated. This redundancy pressure valve thus serves as an air admission valve as well as an exhaust valve for the control chamber pressure. In the actuated (closed) state, the second solenoid valve 8 cuts off the redundancy pressure from the control chamber of the relay valve 2.

The first solenoid valve 7 is designed as an air admission valve through its connection to the supply pressure at inlet 4, and the third solenoid valve 9 serves as an exhaust valve for the control chamber of the relay valve 2 through its connection to the pressure sink 16.

The solenoid valves 7, 8 and 9, contrary to the series connection of the valves according to the DE 42 27 084 A1, are connected in parallel to each other, so that they can be actuated simultaneously.

Thus, for example, in case of full braking when the air admission valve 7 is actuated to increase the pressure, the redundancy valve 8 can remain at the same time in its non-actuated (open) position. The redundancy pressure which increases during full braking assists the admission of air into the control chamber of the relay valve 2, so that the pressure build-up time is shortened. During exhaustion of a brake, the redundancy valve 8 can also remain in the non-actuated (open) state while the exhaust valve 9 is actuated, so that the time required for the pressure drop of the control-chamber pressure in the relay valve 2 is also shortened.

Due to the identical nature of the magnet coils and the armatures of the solenoid valves 7, 8 and 9, as mentioned below, these valves present an identical switching behavior so that a desired time response of pressure build-up and pressure drop in the control chamber of the relay valve 2 can be obtained in a very controlled manner by selecting suitable actuation times for the solenoid valves.

Figure 3:
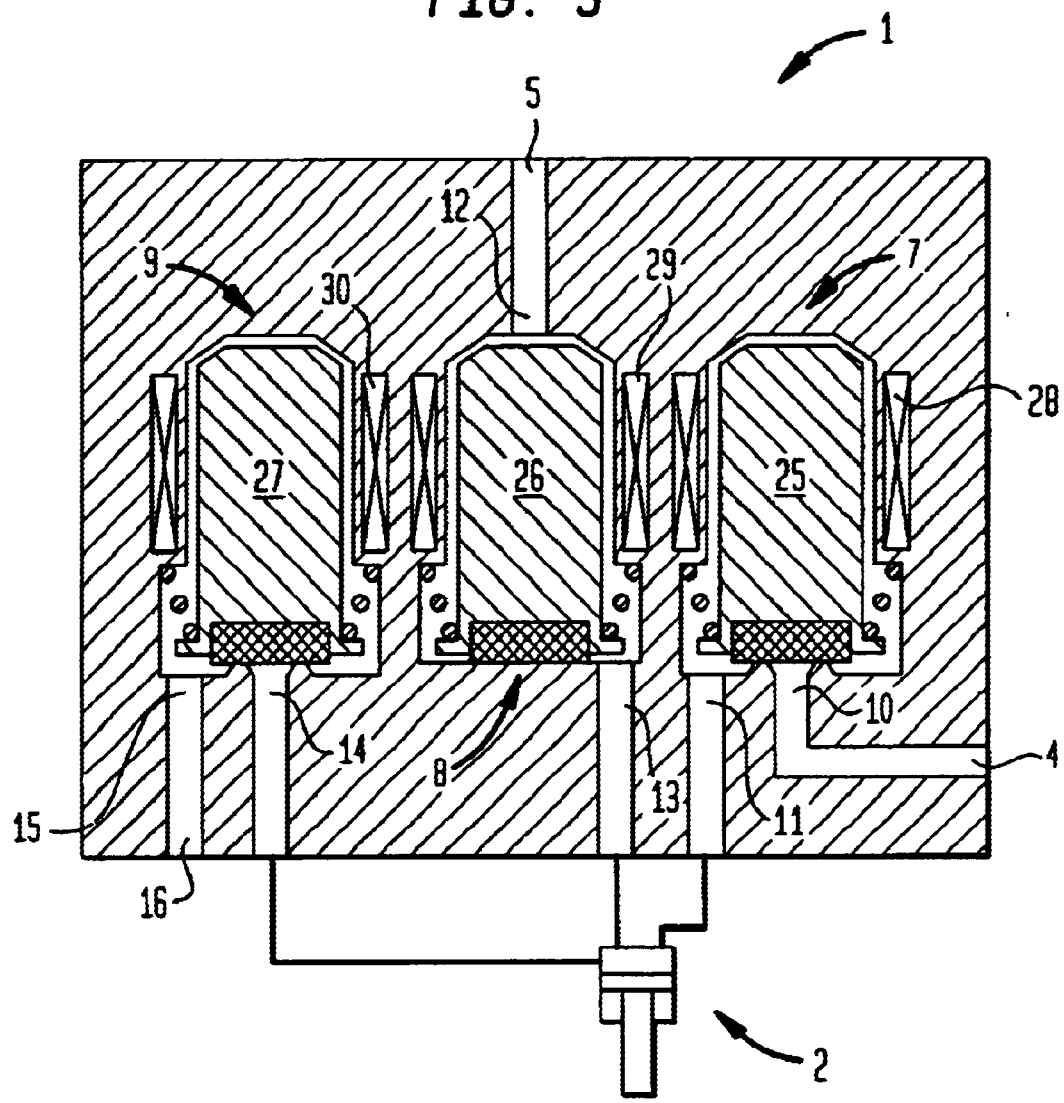
FIG. 3 shows a valve design for a pre-engagement unit according to FIG. 1.

FIG. 3 shows the detailed construction of the solenoid valves 7, 8, and 9 in a valve block having appropriate connecting conduits or channels. The armature 25 of the solenoid valve 7 is of the same construction as the armature 26 of the solenoid valve 8 and as that of the armature 27 of the solenoid valve 9. It should be noted that FIG. 3 shows the interconnection of the terminals 11, 13 and 14 of the pneumatic output terminal 6 of the pre-engagement unit 1 according to the preceding description.

The solenoid valves contain magnetic-flow bundling ferromagnetic yokes that increase the magnetic force in a suitable manner. In the housing of the valve block containing the solenoid valves are also magnetic-flow bundling elements which act to increase the magnetic force and are made in a suitable form, e.g., of ferromagnetic materials. For the sake of simplification and greater clarity the magnetic-flow bundling elements, as components of the valve-block housing or of the magnet coils 28, 29, 30, are not shown.

FIGS. 4a–4f show how different functions can be realized by using identical magnet coils. The reference numbers are uniform for the different valve variants, so that they can be transferred directly from one valve design to another valve design.

Figure 4A:
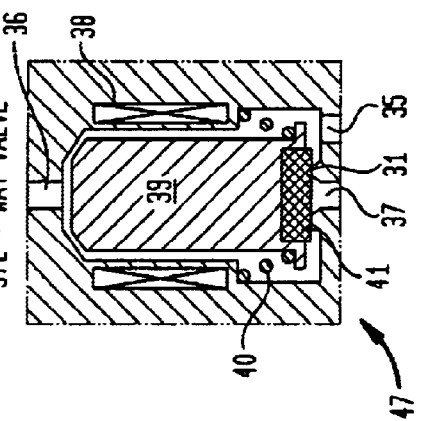
FIGS. 4a–4f show several designs of an armature and its integration in a magnet coil in order to constitute a hermetically sealing valve seat for the magnet when not under current, and a non-hermetically sealing metal-to-metal valve seat for the magnet when under current.

A normally closed 2/2-way solenoid valve 43 is shown in FIG. 4a in the currentless position of the magnet coil 38. Since no magnetic force acts in this position, the armature 39 is displaced by the force of the armature return spring 40 against a valve lift stop where a sealing seat 31 is provided at this location. An elastomer insert 41 is pressed against the sealing seat 31 and the first terminal 35 is hermetically sealed off from the second terminal 36.

Figure 4C:
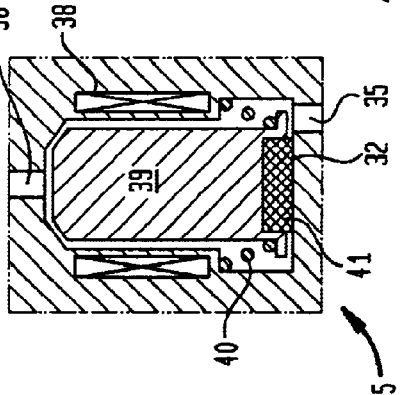
Figure 4E:
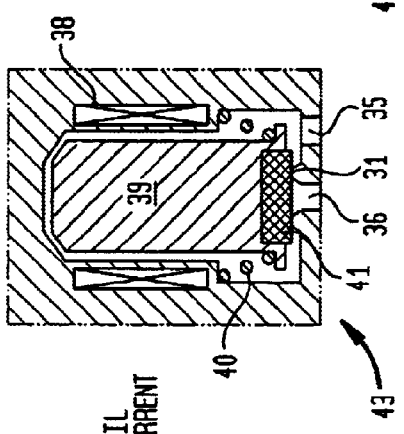
Figure 4B:
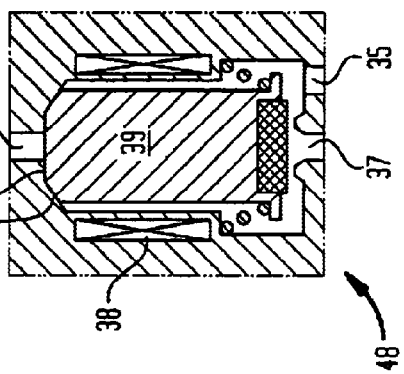

A normally closed 2/2-way solenoid valve 44 is shown in FIG. 4b in the current flowing state of the magnet coil 38. The armature 39 is pressed by the magnetic force against a valve lift stop 33, the valve seat 31 opens, and the first terminal 35 is connected to the second terminal 36.

The next valve variant shows in FIG. 4c a normally open 2/2-way solenoid valve 45 in the currentless switching state.

Under the action of the armature return spring 40, the armature 39 is pressed against a valve lift stop 32 which, however, is not equipped with a sealing seat in this case. In this switching position, the first terminal 35 is connected to the second terminal 36.

Figure 4D:
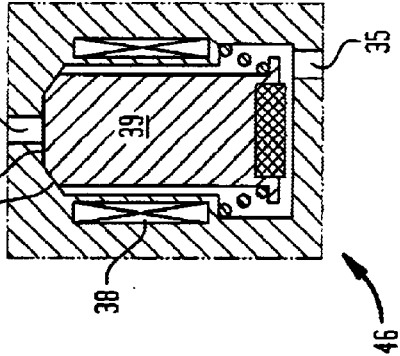

The normally open 2/2-way solenoid valve 46 is shown in FIG. 4d in the switching state under current. The armature 39 is pressed against a valve lift stop 34 and due to the shaped surface 42 on the armature 39 constitutes at this point a metal-to-metal valve seat together with the second terminal 36. The first terminal 35 is separated from the second terminal 36. The metal-to-metal valve seat, contrary to the valve seat described earlier using the elastomer insert 41, is not hermetically sealing, i.e., leakage occurs. As explained below, the pneumatic circuit technology used for the utilization of these valves is selected so that these leakages are of no importance.

Figure 4F:
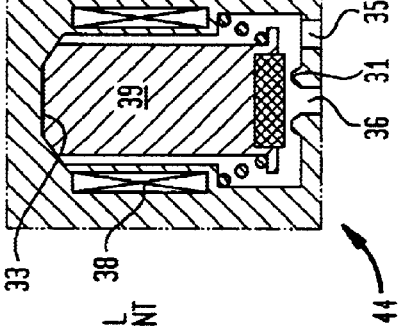

Although such a valve is not needed with the pre-engagement unit of the present invention, FIGS. 4e and 4f show for the sake of completeness that by using the same armature 39, it is also possible to constitute the 3/2-way solenoid valves 47 and 48.

In FIG. 4e, the 3/2-way solenoid valve 47 is shown in the currentless switching state of the magnet coil 38. Under the action of the armature return spring 40, the armature 39 is pressed against the valve lift stop 31 with the sealing seat. The first terminal 35 is separated from the third terminal 37 via this valve seat, but a connection exists between the first terminal 35 and the second terminal 36.

In FIG. 4f, the 3/2-way solenoid valve 48 is shown in its state under current. The magnetic force causes the armature 39 to be pressed against the valve lift stop 34 with its shaped surface 42 constituting a metal-to-metal sealing seat. As a result, the first terminal 35 is separated from the second terminal 36, but the first terminal 35 is connected to the third terminal 37.

By comparison with the pneumatic circuit of FIG. 1 which utilizes the valve design according to FIG. 3, it is shown that in the rest position of the pre-engagement unit which is given by the currentless switching state of all three solenoid valves 7, 8 and 9, only hermetically sealing valve seats are being used under the effect of the armature return spring. Thus, the solenoid valves 7 and 9 are closed and the solenoid valve 8 is open in the currentless switching state.

Only when a desired change takes place in the control chamber pressure in the relay valve 2 is the air admission valve 7 actuated to increase the pressure, or the exhaust valve 9 is actuated to decrease the pressure, each in pulsating fashion.

If the influence of the redundancy pressure is to be eliminated with this pressure increase or pressure reduction, the redundancy pressure valve 8 is actuated and the redundancy pressure appearing at the second pneumatic inlet 5 is separated from the relay valve control chamber (pneumatic output terminal 6) by the metal-to-metal valve seat which takes effect in this switching state.

Since leakage may occur at this valve seat as mentioned earlier, the separation is not hermetical, i.e., the existing redundancy pressure will influence the control chamber pressure in the relay valve 2 to a small extent by the valve seat leakage. This influence is unimportant, however, since, as explained before, a pulsating air admission takes place at the same time through the air admission valve or a pulsating exhaust takes place through the exhaust valve with the full cross-sections of these valves taking effect in either case. The leakage cross-section is on the one hand extraordinarily small as compared to the valve cross-sections, and on the other hand pulsation is carried out in a closed regulation loop, i.e., air admission or exhaust pulsation takes place, until the braking pressure delivered at the pneumatic output terminal 18 of the relay valve 2 is equal to a target braking pressure calculated by the electronic control unit. (The calculation of the target braking pressure value in the electronic control unit is based, in addition to the electrical braking set value, on additional influence factors caused by load or ABS brake regulation.) When the target braking pressure value is reached, pulsation is terminated and the solenoid valves 7 and 9 are placed again in the currentless switching state; the redundancy valve 8 continues to remain actuated. If a minute exhaust of the control chamber of the relay valve 2 should now occur due to the metal-to-metal valve seat, recognized by a lowering of pressure at the pneumatic output terminal 18, this lowering of pressure is compensated for within the framework of pressure regulation by means of a single pulsation of the air admission valve 7.

When a valve seat is closed by the magnetic force and after the magnet coil is first subjected to current, only a low magnetic force flow is built up due to the distance in space between the armature and the valve seat (the ferromagnetic circuit is not closed). In order to move the armature at all, a strong current must produce a strong actuating force which is only a fraction of the subsequent holding force for the armature. Due to the constant feeding of a very strong current, the armature of a solenoid valve is accelerated and thereby kinetic energy is built up which is dissipated again when the armature touches the valve seat.

In conventional valves according to the state of the art, an elastomer insert produces the seal at the valve seat.

In order to avoid the destruction of the elastomer during a lasting load by the dissipation of the kinetic accelerating energy of the armature when it meets the valve seat, such an elastomer insert is not connected rigidly but elastically to the body of the armature. In the German patent document DE 27 57 803 A1, FIG. 4 shows an armature with two elastomer sealing inserts (therein 50' and 52') for two valve seats that are supported elastically (therein by springs 51 and 53). An elastic sealing seat of this type of construction requires a relatively long valve stroke that may be, e.g., 1.2 mm long so that the spring action may be at all effective. Such a construction also requires a certain minimum structural size so that an elastic construction may fit in, and this leads to a relatively large armature mass that in turn requires a corresponding reinforcement of the armature return spring. The stronger return spring then leads to an increase of the required magnetic force to about 30 N with such a valve seat construction. The switching time (current supplied to the magnet coil until the valve seat closes) is essentially the time required to build up the current in the magnet coil and is typically on the order of 25 ms.

In applications for pre-engagement, these valves must normally have a nominal width of approximately 2.2 mm in order to avoid a sharp pressure drop that may occur through the compressed air pilot lines which bridge the distance between a valve and the air accumulating relay valve control chamber.

When these type of pre-engagement valves are operated in a closed pressure regulation mode, the nominal value of approximately 2.2 mm causes the emitted pressure not to be very fine-tuned by steps and the switching time of approximately 25 ms leads with a conventional scanning regulator to a limitation of the obtainable pressure gradient of the emitted pressure used.

With a valve design according to the present invention, however, and due to the fact that the armature has an elastomer insert at only one end and not at both ends, and due also to the fact that on the opposite end of same there is only a shaped surface to constitute a metal-to-metal sealing seat, it is possible to employ a small structural form for the armature. As a result, the mass of the armature is reduced to approximately 6 g and due to the weak armature return spring, a magnetic force of only approximately 6 N is required.

Providing the armature with a shock absorbing coating as suggested in the German patent document DE 197 30 276 A1 ensures suitable resistance to acceleration of the shaped surface at the metal-to-metal sealing seat.

Due to the fact that the sealing in a metal-to-metal sealing coat is not achieved by compressing the elastomer and that no range of spring is necessary, a very short valve stroke of approximately 0.5 mm can be employed. With this short valve stroke and the already weak armature return spring, an elastic support of the elastomer insert as in the above-mentioned state of the art is no longer necessary.

With a small armature, only a small magnet coil is needed. Due to these small dimensions, it is then possible, as explained below, to provide a triple magnet coil unit in which the armatures together with the return springs are integrated into a compact, preassembled unit. This small-size assembly also makes it possible to provide short bores for the channel going to the relay valve 2 without unacceptable throttling of the compressed air.

Thanks to these optimized compressed air connections, the nominal width of a solenoid valve can be reduced to a value around 1.7 mm, representing an optimal value for a pilot valve in vehicle applications. It ensures on the one hand that the braking pressure can be well transmitted in steps, and on the other hand it is not so small that the usual pollution of the compressed air in vehicles would play a role.

By means of the measures described here, the switching times of the solenoid valves can be reduced to approximately 6 ms instead of the 25 ms typical of the state of the art. With the reduced switching times, rapidly changing set target values for the braking pressure regulator can be realized, and high gradients for the generated braking pressure can be realized at the output terminal 18 of the relay valve 2.

It has already been explained above that according to FIG. 1, the 2/2-way solenoid valves 7, 8 and 9 can be actuated simultaneously thanks to their parallel connection, thus shortening the pressure buildup and pressure reduction times of the relay valve control chamber pressure.

Figure 5:
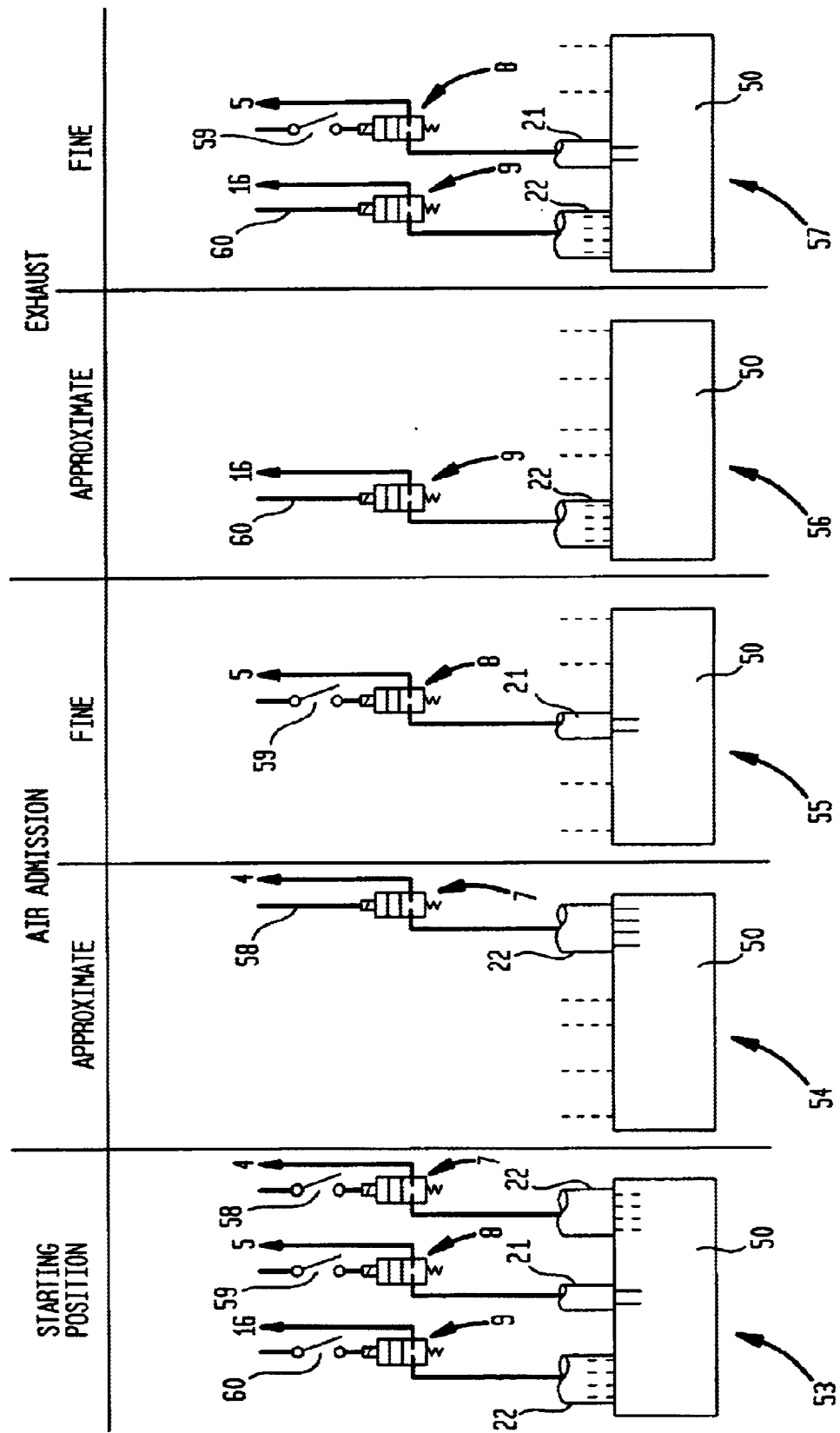
FIG. 5 shows several configurations of the valve system of the pre-engagement unit of FIG. 1 that result in improved pressure/time performance and steppability.

FIG. 5 shows as an example how rapid and fine-tuning of the modulation pressure can be realized by using the three valves 7, 8, and 9 together, this being applicable to all driver-initiated braking commands as well as to pressure modulation during ABS control. For the sake of simplicity, the previously mentioned parallel connection of the valves to shorten the time of rapid air admission as well as rapid air exhaust shall not be discussed in detail hereinafter. FIG. 5 is based on the pre-engagement unit circuit according to FIG. 1.

In the pre-engagement unit 1 of FIG. 1, the solenoid valves 7, 8, and 9 serve as pilot valves to admit air into or exhaust air from the relay valve control chamber of the relay valve 2, the pressure of which is equal to the generated pressure appearing at the output terminal 18 of the relay valve 2, less the pressure drop caused by hysteresis (0.2 to 0.5 bar) in the relay valve itself. The relay valve pressure drop is compensated for by the electronic control unit 3 (FIG. 2) within the closed regulation loop.

It is therefore the task of these three pilot valves to set the relay valve control chamber pressure to a pressure that, aside from the closed loop control deviation, is equal to a target pressure determined by the electronic control unit 3. For this pressure adjustment, there are two different criteria of importance, namely, speed and precision that are in opposition to each other.

Within the framework of pressure regulation, the valves are actuated in pulsated manner, and to realize high speeds a large flow through valve cross-section must be selected. However, this reduces precision. Conversely, great precision but low speed is achieved with a small flow through valve cross-section. The speed is determined by the maximum pressure gradient with which the set target pressure is reached (air admission gradient when pressure is increased, exhaust gradient when pressure is decreased).

In order to achieve sufficient speed while at the same time maintaining a predetermined degree of precision, a method is already known to provide two air admission valves and two exhaust valves serving a relay valve control chamber. One of each pair of air admission valves and exhaust valves of this known configuration has a large cross-section which ensures the required speed, while the other of each pair of air admission and exhaust valves has only a small cross-section to ensure the required precision. By actuating the valves with the large cross-sections first, the target pressure is reached quickly but only approximately. The target pressure is then adjusted precisely by actuating the valves with the small cross-sections. (Solutions with more than two different cross-sections also exist, but these are very costly.)

According to one aspect of the present invention, the cost of this known pre-engagement unit can be reduced by reducing the number of valves from four to three, with one of these valves taking over the additional function of a redundancy valve as required for the braking pressure modulator.

According to the present invention, an exhaust valve with small cross-section is dispensed with so that now, in addition to an air admission valve with a large cross-section, only one air admission valve with a small cross-section and one exhaust valve with a large cross-section are required. With this arrangement, the rapid/slow air admission and the rapid exhaust take place as described above. The air admission valve with the small cross-section is also connected in parallel to the exhaust valve with the large cross-section as described earlier for slow exhaust. Thus, part of the exhaust air stream is compensated for by the admitted air stream, and this results in a reduction of the exhaust air stream, i.e., to an overall reduced exhaust air stream.

A valve arrangement equivalent to the one just described is shown in FIG. 5 wherein the air admission valve 7 is provided with the large cross-section 22, the exhaust valve 9 is also previded with the large cross-section 22, and the redundancy value 8, acting as an air admission valve as in the explanations given below, is provided with the small cross-section 21. Analogous to the operating procedure described above, fine-tuned exhaust takes place with the configuration according to the reference number 57 whereby the exhaust valve 9 with its large cross-section 22 and the redundancy valve 8 with its small cross-section 21 are connected in parallel and act in opposition to each other (i.e., a valve designed for rapid pressure reduction is connected in parallel with a valve designed for slow pressure increase). The fine-tuned air admission takes place with the configuration according to reference number 55 solely through actuation of the redundancy valve 8 with its small cross-section 21. The rapid air admission takes place with the configuration according to reference number 54 solely through actuation of the air admission valve 7. The rapid exhaust takes place with the configuration according to reference number 56 solely through actuation of the exhaust valve 9.

For the sake of clarity the valves 7, 8, and 9 which are used for the above-described air admission and exhaust processes are shown in the configuration with reference number 53 in their initial positions. The current switches 58 (for the first solenoid valve 7), 59 (for the second solenoid valve 8), and 60 (for the third solenoid valve 9) are shown as open switches in configuration 53, and this represents the non-actuated state of these solenoid valves. In the different air admission and exhaust events according to the configurations of reference numbers 54, 55, 56 and 57, the current switches of all participating solenoid valves are shown either in the closed state (which means that the corresponding valve is actuated), or in the open state (which means that the corresponding solenoid valve is not actuated). Thus, the state of actuation of the valves can be easily discerned in FIG. 5 for each air admission or exhaust event..

In the valve combinations described above, as well as in prior art combinations with four valves and in the two last-described valve combinations with three valves, the supply pressure is available through pneumatic inlet 4 as the pressure source for the air admission processes, i.e., for the "rapid" air admission events utilizing a large valve cross-section, as well as for the "fine-tuned" air admission events utilizing small valve cross-section. The pressure circuit of FIG. 1 according to the invention is freed from exclusive reliance on the supply pressure for air admission processes in that in the circuit according to FIG. 1, the redundancy valve 8 is connected to the redundancy pressure source via the second pneumatic inlet 5 of the pre-engagement unit 1. As explained, the redundancy valve 8 is used for fine-tuned air admission and has a small valve cross-section 21, whereas the air admission valve 7 and the exhaust valve 9 are provided for approximate air admission and are therefore provided with a large valve cross-section 22.

In practice, a valve cross-section of, e.g., approximately 2.3 mm$^2$, corresponding to a nominal diameter of approximately 1.7 mm, is suitable for the redundancy valve 8. This value for valve cross-section 21 represents an optimal value for a fine-tuned air admission pilot valve in vehicle applications. It ensures on the one hand good steppability of the delivered braking pressure, and on the other hand is not so small that the usual pollution of compressed air in vehicles is a factor.

For the large valve cross-section 22 of the rough air admission, a value is selected which, as compared with the fine-tuned air admission air stream, results in an air flow that is increased by 50 to 100%. For an air flow that is increased by around 50%, a rough air-admission valve cross-section of approximately 3.4 mm$^2$ is suitable, corresponding to a nominal value for the diameter of approximately 2.1 mm. With a desired air flow increase of 100%, a valve cross-section of approximately 4.5 mm$^2$, corresponding to a nominal diameter of approximately 2.4 mm, is suitable for the valve cross-section 22.

It should be added that the rough air admission valve cross-section could also be larger if desired, so that the relationship between the rough air admission air stream and the fine-tuned air stream could be further increased.

In case of a braking action initiated by the driver, the electric braking command signal for this braking action appears practically without delay via line 20 at the electronic control unit 3. The redundancy pressure corresponding to this braking action builds up with delay at the second pneumatic inlet 5 of the pre-engagement unit 1, this being caused by the delay in the trailer brake valve and in the pressure channel. Following these delays, the redundancy pressure will depend on the wish of the driver without any input from load-dependent braking force regulation, resulting in the braking pressure delivered to a wheel axle being lower under certain conditions than the redundancy pressure. The braking pressure which is reduced by an ABS regulation is of course also lower at a wheel brake than the redundancy pressure. With rare exceptions, this redundancy pressure set by the driver represents the upper limit of all braking pressures on the wheel brakes of the trailer vehicle. Since the redundancy pressure is on the one hand lower than the supply pressure, but on the other hand still represents the upper limit for all braking pressures, it is especially well suited as a pressure source for fine-tuned air admission through a suitably sized, smaller valve cross-section.

Since the electronic control unit 3 is informed via the previously described pressure sensor located on the trailer brake valve of the redundancy pressure appearing at any point in time at the second inlet 5 of the pre-engagement unit 1, the momentary redundancy pressure is also taken into account in the algorithms which determine the timed actuations of the pilot valves as explained below.

When the driver sets a new braking value which shall be assumed to be great, air is admitted into the relay-valve control chamber as shown in the configuration of reference number 54, at first "approximately" by the air admission valve 7 with its large valve cross-section 22. The actuation time of the air admission valve 7 set by the electronic control unit 3 is determined first of all by the set electrical target braking value which is converted in a known manner, e.g., while taking into account the load of the vehicle, into a suitable target braking pressure for the wheel brakes of a vehicle axle which is finally produced at the output terminal 18 of the relay valve 2, within the framework of brake pressure regulation. Furthermore, the pressure difference appearing at the air admission valve 7 which causes the air flow to the relay valve control chamber determines the actuation time. Since the relay valve control chamber had been cleared of air from the moment of previous brake application until the present braking start, this pressure difference is equal to the supply pressure itself.

Knowing the large valve cross-section 22, the actuation time for the air admission valve 7 can be set, e.g., proportional to the pressure difference and to the target braking pressure, with the valve switching time itself taken into account in a suitable manner (the exponential function of the air admission is approximated by a straight line, the slope of which corresponds to the product of the pressure difference and the target braking pressure).

Following approximate air admission, a pressure prevails in the relay valve control chamber that is assumed to be lower by a value Δp than the target braking pressure. Upon the subsequent fine-tuned air admission in the configuration according to the reference number 55 utilizing the redundancy valve 8, the value Δp should become zero. The actuation time of the redundancy valve 8 is therefore determined by the pressure difference appearing at the valve, which represents the difference between the momentary redundancy pressure and the pressure in the relay valve control chamber (which is approximately equal to the pressure generated at the output terminal 18), in combination with the known smaller valve cross-section 21 producing an air flow which results in the target braking pressure appearing at the relay valve control chamber upon completion of the fine-tuned air admission pulse. This actuation time is therefore proportional to the pressure difference appearing at the valve and to the desired pressure increase Δp.

If an existing braking pressure is to be reduced completely, this is achieved in the explained manner according to the configuration reference number 56 via the exhaust valve 9. The actuation time results from the large valve cross-section 22 and the pressure difference via the exhaust valve 9 in the manner described earlier.

If, on the other hand, an existing braking pressure is to be reduced only slightly, the relay valve control chamber is exhausted in the manner described in connection with the configuration of reference number 57 via the parallel connection of the exhaust valve 9 and the redundancy valve 8. The exhaust air stream produced by the exhaust valve 9 (dependent on the pressure difference via the exhaust valve 9, i.e., dependent upon the relay valve control chamber pressure) is reduced by the air admission stream via the redundancy valve 8 (this air stream depending on the pressure difference between the momentary redundancy pressure and the relay valve control chamber pressure). The actuation time for which both valves are actuated simultaneously is selected so that the superimposition of the two air streams results in the desired braking pressure reduction in the relay valve control chamber.

As indicated earlier, the known pre-engagement unit can also be realized according to the German patent application DE 42 27 084 A1 mentioned initially with the embodiments illustrated in FIGS. 4c and 4f. It is also possible with a pre-engagement unit of this design to take the redundancy pressure into account advantageously for the production of a braking pressure desired by the driver.

When the brake pedal is actuated, the braking pressure produced in the trailer should first rise with the greatest possible gradient. For this purpose the 3/2-way switching valve 9 (therein 12 of FIG. 2 ) is actuated in a first phase so that the supply pressure (therein 17) is transmitted via the non-actuated exhaust valve (therein 9') and the also non-actuated block off valve (therein 7) into the control chamber of the relay valve (therein 3). This approximate air admission is maintained until the generated braking pressure has sufficiently approached the braking pressure desired by the driver which is indicated by the position of the brake pedal. In this first phase, this approximate braking pressure is reached in the shortest time that is at all possible with the indicated pneumatic design of the installation.

In a second phase, fine-tuned air admission is then effected, and for this the 3/2-way switching valve (therein 12) is placed in its non-actuated state so that from that point in time on, any further air admission of the relay valve control chamber takes place through the valves (therein 9' and 7) which continue to be non-actuated. Due to the negligible pressure difference between the redundancy pressure and the braking pressure delivered by the relay valve, no overshoot normally takes place with this fine-tuned air admission, so that an optimal balancing out of the produced braking pressure is ensured in phase 2.

According to the above explanations, the appropriate point in time for the change from the first phase to the second phase is determined by the pressure value measured by the pressure sensor located in the trailer brake valve.

If the braking pressure desired by the driver should be exceeded in special instances during the fine-tuned air admission, this pressure excess is reduced again by a brief actuation of the exhaust valve (therein 9').

Because the solenoid valves of this known patent are operated according to the principles of FIGS. 4c and 4f, and because they are actuated in a timed manner, the proper functioning of this design variant of the known pre-engagement unit is possible.

It is indeed advantageous for the above-described 2-phase air admission process if a pneumatic pre-engagement unit circuit according to FIG. 1 herein is used because only 2/2-way valves are employed and no costly 3/2-way solenoid valve is needed. In the embodiment of FIG. 1, the approximate air admission in phase 1 takes place by actuating the first solenoid valve 7, while the normally open second solenoid valve 8 is actuated at the same time in order to bring this valve into its closed position. In phase 2, the second solenoid valve 8 becomes non-actuated for fine-tuned air admission with the redundancy pressure. Valves 7 and 9 are also non-actuated during phase 2 of air admission. At the end of phase 2, the second solenoid valve 8 is actuated in order to place it again in its closed position. For the exhaust process, the third solenoid valve 9 is actuated during phase 1 and phase 2 of this process.

The pressure sensor (not shown) located in the trailer brake valve measures the pressure at the second pneumatic inlet 5 through the pneumatic connections between the output terminal of the trailer brake valve and the second pneumatic inlet 5 of the pre-engagement unit 1. (The dynamic pressure equalization processes which can be disregarded in this connection are not taken into account here.) The measured pressure value at the second pneumatic inlet 5 of the pre-engagement unit 1 therefore determines the appropriate point in time for the change from the first to the second phase.

Figure 6:
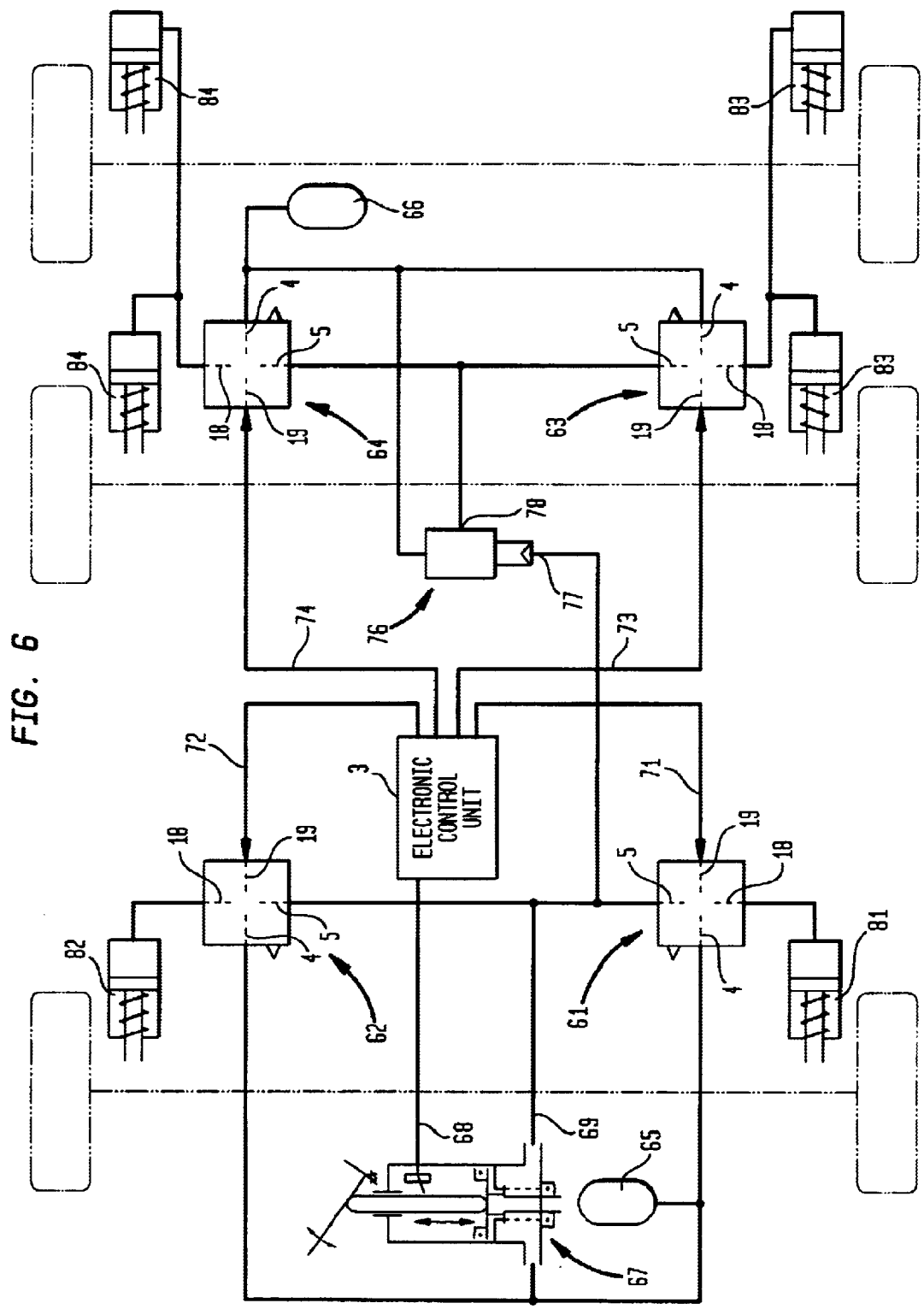
FIG. 6 is a schematic diagram of an electronic braking system having several pre-engagement units according to FIG. 1 installed in a tractor vehicle.

The method which consists of connecting the solenoid valves of the pre-engagement unit in parallel can also be applied advantageously to a tractor vehicle. The arrangement of the components of such an electronic braking system is shown in FIG. 6. In FIG. 6, braking pressure modulators are provided for the wheels of a two-axle tractor vehicle, with the rear axle being made in the form of a double axle. For the sake of clarity the braking pressure modulators are shown as separate individual blocks; each block therefore contains the combination of the pre-engagement unit 1 and the relay valve 2 shown in FIG. 1. At the terminal points of the blocks, on the inwardly directed connections points, the terminals for the supply pressure at the first pneumatic inlets 4 of the pre-engagement units 1, the terminals for the redundancy pressure at the second pneumatic inlets 5 of the pre-engagement units 1, the terminals for the inlets of the electrical control lines 19 of the pre-engagement units 1, and the terminals for the output terminals 18 of the relay valves 2 are shown. The pneumatic/electric circuit of the braking pressure modulator blocks is represented in its entirety with these designations as well as the external terminal connections to the blocks.

The braking pressure modulator 61 is provided for the left wheel on the front axle, the braking pressure modulator 62 is provided for the right wheel of the front axle, the braking pressure modulator 63 is provided for the wheels on the left side of the rear double axle, and the braking pressure modulator 64 is provided for the wheels on the right side of the rear double axle.

The electronic braking system illustrated in FIG. 6 is equipped with a brake circuit split and this means that a first air container 65 is used for the front axle and a second air container 66 is used for the rear double axle. The first pneumatic inlets 4 of the braking pressure modulators 61, 62 for the front axle are connected to the first air container 64, and the corresponding pneumatic inlets 4 of the braking pressure modulators 63, 64 for the rear axle are connected to the second air container 66.

In electronically controlled braking systems for a tractor vehicle, the driver sets the target delay by means of an electric/pneumatic brake signal transmitter. The brake signal transmitter contains on the one hand electrical sensors transmitting a value equal to the vehicle's target delay value to the electronic control unit, and on the other hand the driver's foot mechanically actuates distance or force-controlled pneumatic valves producing one or several redundant braking pressures. These pressures, which are also proportional to the target delay, are used as auxiliary braking pressures that are directed to the actuating valves and are thereby used to brake the wheel brake cylinders in case of failure of one or several braking circuits.

These redundancy pressures can be used with the braking pressure modulators as control pressures for the redundancy valves. In FIG. 6, a redundancy pressure 69 is delivered to the braking pressure modulators 61, 62, 63, 64 as explained below.

The brake signal transmitter 67 produces the electrical braking command signal 68 (the vehicle's target delay value) and the pneumatic redundancy pressure 69 in the described manner. The brake signal transmitter pressure supply inlet is connected to the first air container 65. The drawing of the brake signal transmitter 67 in FIG. 6 shows in a simplified manner how a tappet is actuated by the brake pedal against the force of a return spring, and how a pneumatic redundancy pressure 69 corresponding to the tappet actuation is produced at the output terminal of a valve system designed on the principle of the relay valve. The tappet actuation is furthermore determined by a potentiometer in this example, and a force level corresponding to this determination represents the electric braking command signal 68. As an example of a practical embodiment of a brake signal transmitter, the German patent application DE 33 08 279 A1 should be mentioned (the brake signal transmitter is designated as a motor car brake valve in that patent application).

The electric braking command signal 68 is transmitted to the electronic control unit 3. In the electronic control unit and according to the principles of electronic braking systems, braking pressures for the individual wheels of the vehicle are calculated from this braking command signal, and other information such as, e.g. the load, and based on the actual target braking pressures, control signals are transmitted to the braking pressure modulators. For the braking pressure modulator 61 at the front left, these are the control signals 71, for the braking pressure modulator 62 at the front right they are the control signals 72, for the braking pressure modulator 63 at the rear left they are the control signals 73, and for the braking pressure modulator 64 at the rear right, they are the control signals 74.

It should be added that every pressure produced in a braking pressure modulator with the help of the control signals (this is the inlet pressure of the appertaining relay valve) is measured by means of a pressure sensor for the regulation of pressure in the electronic control unit 3. These pressure sensors are not shown in the drawing of FIG. 6 for the sake of clarity.

The individual braking pressures produced in the described manner in the braking pressure modulators are fed into the wheel brake cylinder 81 on the left of the front axle, into the wheel brake cylinder 82 on the right side of the front axle, into the two wheel brake cylinders 83 on the rear double-axle on the left side and into the two wheel brake cylinders 84 on the rear double axle on the right side.

The redundancy pressure is processed directly in the pre-engagement units of the braking pressure modulators in the same manner as described above in the application with a trailer vehicle, with the difference that the redundancy pressure which is delivered in the trailer vehicle by the trailer brake valve, is produced in the tractor vehicle directly by the brake signal transmitter as described earlier. As is shown in FIG. 6, the redundancy pressure 69 produced by the brake signal transmitter 67 is pneumatically connected to the redundancy inlets 5 in the pre-engagement units of the brake signal transmitter 67 at the front axle left and right. To ensure the brake circuit split (in case of a leakage it ensures that only the air container of the circuit affected by the leakage becomes pressure-less while the other air container retains its pressure, so that this circuit remains operational) the redundancy pressure is "buffered" via a relay valve 76 supplied from the second air container 66 for transmission to the braking pressure modulators 63, 64 of the rear axle.

The inlet 77 of the relay valve 76 is connected pneumatically to the redundancy pressure 69. The relay valve 76 has an amplification of 1 and therefore it delivers the pressure appearing at inlet 77 at its output terminal 78. The redundancy pressure also appears at the braking pressure modulators 63, 64 through the connection to the redundancy pressure inlets 5 of the pre-engagement units for these braking pressure modulators.

As described in connection with the explanations for FIG. 5, it is also possible in tractor trailer vehicles to shorten the time required for braking pressure to build up thanks to a parallel connection of valves acting in the same sense (simultaneous supply pressure and redundancy pressure air admission), while a parallel connection of valves acting in the opposite sense (exhaust simultaneously with redundancy pressure air admission) makes it possible to fine-tune the reduction of braking pressure.

In other words: faster pressure changes occur in the pre-engagement chamber of the relay valves 2 in the first case based on the additional nominal diameters, and in the second case the characteristics of fine-tuned steppability of the pre-engagement chamber pressures can also be applied.

This arrangement of functions provides yet another advantage. If, for example, the redundancy valve path is actuated in a pulsating manner solely for slow pressure build-up in case of an adaptive braking in the partial braking range, the pressure build-up in the wheel brake cylinder takes place in the closed regulating circuit while the cylinder pressure is being sensed. In this case, the electrical and pneumatic functions of the redundancy pressure valve can be fully checked. As a result, the valve function in the sense of a function-sharing redundancy can be monitored, and a failure of this valve unit can be signaled immediately to the driver. This advantage also applies to the embodiment for trailers.

Compared with a redundancy valve operation that does not participate in the build-up of the operating braking pressure, this is a great advantage and gain in safety.

In the above-mentioned utilization of the method according to the invention for a trailer vehicle, examples for an advantageous selection of the nominal value are mentioned. It should be noted that these nominal values may have to be modified if necessary for utilization in a tractor vehicle because of the different pressure conditions prevailing therein.

With the method according to the invention of connecting pilot valves of the pre-engagement unit in parallel, a superimposition of air streams of the participating valves takes place as explained above. With two valves the superimposition causes the mass flow of one valve and the mass flow of the other valve to be linked, whereby the linkage consists either of an addition or a subtraction. In case of an addition, the resulting mass flow represents the sum of the mass flows of the two individual valves, and in case of subtraction, the resulting mass flow is equal to the difference between the two mass flows. (These considerations also apply to the volume flows of both valves.)

The principle of mass flow superimposition can also be transposed from pneumatic to hydraulic systems, so that based on this principle it is also possible to realize the braking pressure modulators for electronic/hydraulic braking systems.

The design of a braking pressure modulator of this type depends of course on the existing conditions in a given application. It depends on the normally considerably higher braking pressures in hydraulic systems which have the result that, e.g., the nominal values of the valves and the strokes for the valve actuation are normally smaller than in the case of pneumatic applications. At least different values apply there which must be taken into account in designing the valves.

In hydraulic systems, the fact must furthermore be taken into consideration that these involve a closed circuit including the pump, the tanks and possibly also a hydraulic fluid storage, and this also influences the valve technology for such systems.

In addition, the method according to the invention can also be used for electronically controlled braking systems in rail vehicles. These are mostly made in the form of electronic and pneumatic installations. With these rail vehicles —contrary to the mentioned installation in a road tractor and trailer vehicle —the driver at a driver station in the rail vehicle actuates a brake command. This brake command produces an electrical signal as well as a target delay value for the electronic control system that carries out the brake control as well as at least one pneumatic braking signal that causes direct braking via the wheel brake cylinders of the rail vehicle in case of failure of the electronic system.

In this respect such a braking system for a rail vehicle (or a rail vehicle train) is based on the same design of a comfort-oriented and/or wear-resistant braking system with, e.g., load-dependent braking force under normal conditions where the electronic system is operational, and with emergency braking in case of electronics failure, when a separately produced redundancy pressure causes direct pneumatic braking. Under normal conditions of brake control the sliding and if applicable the slipping protection is of course active, while these functions are switched off in case of electronic failure.

For this reason it is also possible to use braking pressure modulators according to the principle of FIG. 1 for such vehicles. For example, an electric/pneumatic braking pressure modulator consisting as in FIG. 1 of a pre-engagement unit 1 and a relay valve 2 can be provided for each wheel of a rail vehicle train. The air admission, exhaust, and redundancy valves of such an installation take the existing conditions in the rail vehicle into account. In such vehicles, normally much larger nominal widths are used than in road vehicles.

Aside from these design matters, it is possible here too to use the method according to the invention of addition or subtraction of mass flows of different valves for the improvement of the pressure build-up time and to improve the steppability.

While the invention has been described by reference to specific embodiments, this was for purposes of illustration only. Numerous alternative embodiments will be apparent to those skilled in the art and are considered to be within the scope of the present invention.

What is claimed is:

1. A pre-engagement unit for a braking pressure modulator for a pressure regulating circuit of an electronic braking system of a vehicle having an electric braking command signal transmitter which delivers a driver initiated electric brake value setting to an input of an electronic control unit, the pre-engagement unit comprising:
    a) a first pneumatic inlet through which a supply pressure is supplied to the pre-engagement unit;
    b) a second pneumatic inlet through which a redundancy pressure is supplied to the pre-engagement unit;
    c) a first pneumatic output terminal through which the pre-engagement unit is connected to an air quantity augmenting relay valve;
    d) a second pneumatic output terminal through which the pre-engagement unit is connected to a pressure sink;
    e) an electrically actuated valve system comprising a plurality of solenoid valves including a plurality of interconnected pneumatic terminals and a plurality of electrical terminals which are connected to output terminals of the electronic control unit:
    f) wherein under normal conditions, the pressure delivered at the first pneumatic output terminal to be converted by said air quantity augmenting relay valve to a braking pressure is determined by said electric brake value setting;
    g) wherein in the case of failure in said electronic brake system, the redundancy pressure is delivered at the first pneumatic output terminal to be converted by the air quantity augmenting relay valve to the braking pressure; and
    h) wherein under normal conditions, the redundancy pressure is also delivered to the air quantity augmenting relay valve and comprises a component of the braking pressure.

2. The pre-engagement unit of claim 1 wherein the redundancy pressure shortens the time required to achieve a desired braking pressure.

3. The pre-engagement unit of claim 1 wherein said valve system assumes a configurations wherein at least two solenoid valves are connected in parallel in order to decrease the time required to increase or decrease the braking pressure.

4. The pre-engagement unit of claim 1 wherein the redundancy pressure improves the accuracy of achieving a desired braking pressure.

5. The pre-engagement unit of claim 1 wherein said valve system assumes a first configuration for pressure increase and a second configuration for pressure reduction to improve the accuracy of achieving a desired braking pressure, wherein in each of said first and second configurations at least two solenoid valves are connected in parallel to each other.

6. The pre-engagement unit of claim 5 wherein said valve system comprises a plurality of switching solenoid valves which are actuated in pulsated manner.

7. The pre-engagement unit of claim 6 wherein at least one of said solenoid valves has a different flow through cross-section from the other solenoid valves.

8. The pre-engagement unit of claim 7 wherein each of said solenoid valves is a 2/2-way solenoid valve.

9. The pre-engagement unit of claim 8 wherein said electrically actuated valve system comprises:
    i) a first normally closed 2/2-way solenoid valve with first and second pneumatic terminals which serves as an air admission valve for the supply pressure to the air quantity augmenting relay valve;
    j) a second normally open 2/2-way solenoid valve with first and second pneumatic terminals which serves as an air admission/exhaust valve for the redundancy pressure to the air quantity augmenting relay valve; and
    k) a third normally closed 2/2-way solenoid valve with first and second pneumatic terminals which serves as an exhaust valve for the air quantity augmenting relay valve.

10. The pre-engagement unit of claim 9 wherein each of said first, second, and third 2/2-way solenoid valves comprises a valve housing, a magnet coil, an armature, first and second valve lift stops, and an armature return spring which urges said armature against said first valve stop when there is no current in the magnet coil, wherein the armature is urged against the second valve lift stop when there is current flowing in the magnet coil, wherein the first valve stop comprises a sealing seat which provides hermetic sealing, and wherein the second lift stop comprises a metal-to-metal sealing seat.

11. The pre-engagement unit of claim 10 wherein the armatures and the magnet coils of each of said first, second, and third 2/2-way solenoid valves are identical.

12. The pre-engagement unit of claim 9 wherein:
    l) the first pneumatic terminal of the first 2/2-way solenoid valve is connected to the first pneumatic inlet of the pre-engagement unit, and the second pneumatic terminal of first 2/2-way solenoid valve is connected to the first pneumatic output terminal of the pre-engagement unit,
    m) the first pneumatic terminal of the second 2/2-way solenoid valve is connected to the second pneumatic inlet of the pre-engagement unit, and the second pneumatic terminal of the second 2/2-way solenoid valve is connected to the first pneumatic output terminal of the pre-engagement unit; and
    n) the first pneumatic terminal of the third 2/2-way solenoid valve is connected to the first pneumatic output terminal of the pre-engagement unit, and the second pneumatic output terminal of the third 2/2-way solenoid valve is connected to the second pneumatic output terminal of the pre-engagement unit.

13. The pre-engagement unit of claim 1 wherein:
    o) an air admission to a first pneumatic output terminal operation is conducted in first and second timed phases;
    p) in said first timed phase, said solenoid valves of said electrically actuated valve system assume a first configuration whereby said first pneumatic inlet is connected to said first pneumatic output terminal to achieve an approximate air admission; and
    q) in said second timed phase, said solenoid valves of said electrically actuated valve system assume a second configuration whereby said second pneumatic inlet is connected to said first pneumatic output terminal to achieve a fine-tuned air admission.

14. The pre-engagement unit of claim 13 wherein said first timed phase is ended and second timed phase is begun based upon a measured pressure value appearing at the said second pneumatic inlet.

* * * * *